(12) United States Patent
Hasegawa et al.

(10) Patent No.: US 8,323,472 B2
(45) Date of Patent: Dec. 4, 2012

(54) METHOD OF SURFACE TREATMENT OF METAL BASE MATERIAL

(75) Inventors: Hajime Hasegawa, Toyota (JP); Yusuke Watanabe, Toyota (JP)

(73) Assignee: Toyota Jidosha Kabushiki Kaisha, Toyota-shi, Aich-ken (JP)

( * ) Notice: Subject to any disclaimer, the term of this patent is extended or adjusted under 35 U.S.C. 154(b) by 493 days.

(21) Appl. No.: 12/670,439

(22) PCT Filed: Jul. 10, 2008

(86) PCT No.: PCT/JP2008/062879
§ 371 (c)(1),
(2), (4) Date: Jan. 25, 2010

(87) PCT Pub. No.: WO2009/016969
PCT Pub. Date: Feb. 5, 2009

(65) Prior Publication Data
US 2010/0193082 A1    Aug. 5, 2010

(30) Foreign Application Priority Data
Jul. 27, 2007    (JP) ................................ 2007-196451

(51) Int. Cl.
*C25D 5/36* (2006.01)
*B08B 3/10* (2006.01)

(52) U.S. Cl. ........ 205/217; 205/205; 205/210; 205/218; 205/219; 134/26; 134/28; 134/41

(58) Field of Classification Search ................. 134/26, 134/28, 41; 205/205, 210, 217–219
See application file for complete search history.

(56) References Cited

FOREIGN PATENT DOCUMENTS

| | | |
|---|---|---|
| JP | 58-27997 | 2/1983 |
| JP | 2-4999 | 1/1990 |
| JP | 2-85394 | 3/1990 |
| JP | 5-220474 | 8/1993 |
| JP | 7-188976 | 7/1995 |
| JP | 7-303977 | 11/1995 |
| JP | 2006-274303 | 10/2006 |
| JP | 2006-302633 | 11/2006 |
| JP | 2007-323988 | 12/2007 |

OTHER PUBLICATIONS

"Notice of Grounds for Rejection" in Japanese Patent Application No. 2007-196451, filed Jul. 27, 2007 (Mailed Date: Aug. 19, 2008).
Translation of the International Preliminary Report on Patentability dated May 14, 2010, for PCT/JP2008-062879.

*Primary Examiner* — Lois Zheng
(74) *Attorney, Agent, or Firm* — Finnegan, Henderson, Farabow, Garrett & Dunner, LLP

(57) ABSTRACT

The method of surface treatment, as applied onto a metal base material, of the present invention includes a reduction treatment step of reduction-treating the oxide film formed on the metal base material and an oxidation treatment step of oxidation-treating the oxide film having been subjected to the reduction treatment.

14 Claims, 3 Drawing Sheets

(A)

(B) PRE-OXIDATION TREATMENT

REDUCTION TREATMENT (C)

OXIDATION TREATMENT (D)

METHOD OF SURFACE TREATMENT OF METAL BASE MATERIAL

CROSS-REFERENCE TO RELATED APPLICATIONS

This application is a national phase application of International Application No. PCT/JP2008/062879, filed Jul. 10, 2008, and claims the priority of Japanese Application No. 2007-196451, filed Jul. 27, 2007, the contents of both of which are incorporated herein by reference.

TECHNICAL FIELD

The present invention relates to a technique for a method of surface treatment of a metal base material.

BACKGROUND ART

A plating film or the like is formed on a metal base material by plating, vapor deposition or the like to impart, to the metal base material, capability such as corrosion resistance, heat resistance, water repellency or hydrophilicity, as the case may be. However, in the case where a plating film or the like is formed on the metal base material, when an oxide film has been formed on the metal base material, the plating film or the like sometimes tends to be peeled off the metal base material.

The oxide film is formed by a heat treatment or a chemical treatment with an oxidizing agent or the like of the metal base material. In particular, on a metal base material that includes an Fe component such as stainless steel such as SUS304 or SUS316, or iron, an iron-based oxide film or the like is readily formed by heat treatment or the like. For example, stainless steel or the like is used for the base material of a separator for use in a fuel cell. Heat treatment is performed at the time of forming, resin coating or similar processing of a separator for use in a fuel cell, and thus an oxide film may be formed on the stainless steel base material of the separator for use in a fuel cell. Additionally, for the purpose of imparting corrosion resistance or the like to the separator for use in a fuel cell, a plating treatment or the like may be applied onto the stainless steel of the separator for use in a fuel cell, having been subjected to the above-described heat treatment.

An iron-based oxide film or the like is formed on the stainless steel base material having been subjected to the heat treatment, and hence, even when plating is applied to form a plating film on the stainless steel base material, the adhesion of the plating film is poor and thus the plating film tends to peel off due to the effect of the iron-based oxide film.

For example, JP 7-303977 A has proposed a method of surface treatment of stainless steel in which method, for the purpose of removing the oxide film on the stainless steel, a reduction treatment based on an electrolysis treatment is applied to the stainless steel having the oxide film.

Additionally, for example, JP 2-85394 A has proposed a method of surface treatment of stainless steel in which method, for the purpose of removing the oxide film on the stainless steel, an oxidation treatment based on an electrolysis treatment is applied to the stainless steel having the oxide film.

Additionally, for example, JP 7-188976 A has proposed a method of surface treatment of stainless steel in which method, for the purpose of removing the oxide film on the stainless steel, an oxidation treatment based on an electrolysis treatment is applied to the stainless steel having the oxide film, and thereafter a reduction treatment based on an electrolysis treatment is applied to the stainless steel.

The main component of the oxide film on stainless steel is $Fe_2O_3$. Only with a reduction treatment, as is the case in the method of surface treatment of stainless steel according to JP 7-303977 A, $Fe_2O_3$ is reduced into FeO, but it is extremely difficult to remove the oxide film from on stainless steel.

Additionally, with an oxidation treatment, it is difficult to remove $Fe_2O_3$, as is the case in the method of surface treatment of stainless steel in JP 2-85394 A, and an attempt to remove $Fe_2O_3$ only with an oxidation treatment may result in erosion of the stainless steel that is the base material.

Additionally, it is difficult, as described above, to remove $Fe_2O_3$ even when an oxidation treatment is first performed, and consequently it is difficult to remove the oxide film from on the stainless steel even when a reduction treatment is subsequently performed, as is the case in the method of surface treatment of stainless steel in JP 7-188976 A.

DISCLOSURE OF THE INVENTION

The present invention is a method of surface treatment as applied onto a metal base material, which method is capable of removing the oxide film formed on the metal base material.

(1) The method of surface treatment of a metal base material of the present invention includes: a reduction treatment step of reduction-treating an oxide film formed on the metal base material; and an oxidation treatment step of oxidation-treating the oxide film having been subjected to the reduction treatment.

(2) In the method of surface treatment of a metal base material according to the above-described (1), the method preferably further includes a pre-oxidation treatment step of oxidation-treating, before the reduction treatment step, the oxide film formed on the metal base material.

(3) In the method of surface treatment of a metal base material according to the above-described (1) or (2), at least one of the reduction treatment, the oxidation treatment and the pre-oxidation treatment is preferably an electrolysis treatment.

(4) In the method of surface treatment of a metal base material according to any one of the above-described (1) to (3), the metal base material is preferably an iron component-containing metal base material.

(5) In the method of surface treatment of a metal base material according to the above-described (4), the reduction is preferably performed in the reduction treatment step until FeO comes to be included in the oxide film as a component of the oxide film.

(6) In the method of surface treatment of a metal base material according to any one of the above-described (1) to (5), the method preferably further includes a film formation step of forming, after the oxidation treatment step, a metal- or resin-containing film on the metal base material.

(7) In the method of surface treatment of a metal base material according to any one of the above-described (1) to (6), the metal base material is preferably a separator for use in a fuel cell.

According to the present invention, there can be provided a method of surface treatment as applied onto a metal base material, which method is capable of removing the oxide film formed on the metal base material through the inclusion of the reduction treatment step of reduction-treating the oxide film formed on the metal base material and the oxidation treatment step of oxidation-treating the oxide film having been subjected to the reduction treatment.

(8) In the method of surface treatment of a metal base material according to the above-described (1), the reduction treatment is preferably an electrolysis treatment or a chemical treatment using a reducing agent.

(9) In the method of surface treatment of a metal base material according to the above-described (8), the reducing agent is preferably selected from hydrazine, formaldehyde, glyoxal and sodium borohydride.

(10) In the method of surface treatment of a metal base material according to the above-described (1), the oxidation treatment is preferably an electrolysis treatment or a chemical treatment using an oxidizing agent.

(11) In the method of surface treatment of a metal base material according to the above-described (10), the oxidizing agent is preferably selected from anhydrous aluminum chloride/cuprous chloride; alkali metal persulfates; ammonium persulfate; potassium permanganate; quinones such as 2,3-dichloro-5,6-dicyano-1,4-benzoquinone (DDQ), tetrachloro-1,4-benzoquinone and tetracyano-1,4-benzoquinone; halogens such as iodine and bromine; peracids; sulfuric acid; fuming sulfuric acid; sulfur trioxide; sulfonic acids such as chlorosulfuric acid, fluorosulfuric acid and amidosulfuric acid; and ozone.

BEST MODE FOR CARRYING OUT THE INVENTION

Figure 1:
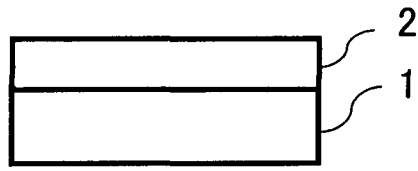
FIG. 1 is a flow chart illustrating an example of a mechanism of the surface treatment of a metal base material according to an embodiment of the present invention, provided with the steps (A), (B), (C) and (D).
Figure 1:
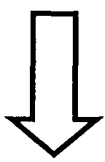
Figure 1:
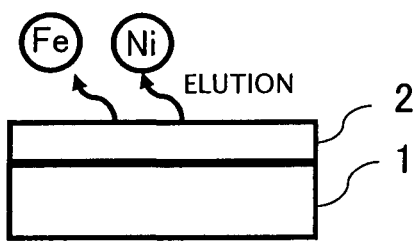
Figure 1:
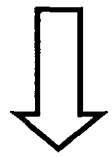
Figure 1:
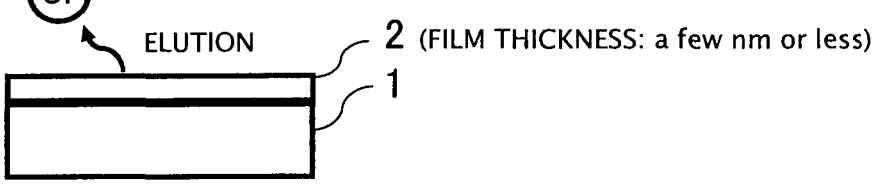
Figure 1:
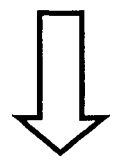
Figure 1:
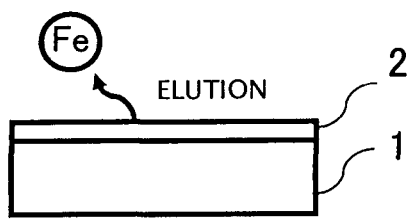

The embodiment of the present invention is described below.

The method of surface treatment of a metal base material of the present embodiment includes a reduction treatment step of reduction-treating the oxide film formed on the metal base material and an oxidation treatment step of oxidation-treating the oxide film having been subjected to the reduction treatment for the purpose of removing the oxide film having been subjected to the reduction treatment.

<Reduction Treatment Step>

In the reduction treatment step, the oxide film formed on the metal base material is subjected to the reduction treatment. The oxide film on the metal base material is formed by a treatment such as a heat treatment or a chemical treatment with an oxidizing agent or the like of a metal base material. It is difficult to remove such an oxide film only by the below-described oxidation treatment, and hence it is necessary to perform the reduction treatment so that the oxide film formed on the metal base material may be able to be removed by the below-described oxidation treatment.

The reduction treatment is only required to be able to reduce the oxide film, and examples of the reduction treatment include a reductive electrolysis treatment and a chemical treatment using a reducing agent.

The reductive electrolysis in the reduction treatment used in the present embodiment conducts electrolysis, for example, in a sulfuric acid-based acidic solution having a pH of 3 or less, preferably a pH of 1 or less, or in an alkaline solution having a pH of 10 or more, with carbon as an anode and the metal base material as a cathode under the conditions that the current density is in a range from 0.5 $A/dm^2$ to 6 $A/dm^2$, the electrolysis amount is 10 $coulomb/dm^2$ or more and the treatment time is 60 seconds or more, preferably 180 seconds or more. For the purpose of suppressing the adhesion, onto the metal base material, of the hydrogen or oxygen generated at the time of the electrolysis treatment, it is preferable to add a surfactant in a content of 0.1 to 10%.

Additionally, when stainless steel is used as the metal base material, the temperature of the solution is set in a range from 0 to 80° C., preferably in a range from 0 to 35° C. The conditions, in the above-described reduction treatment, including the pH, solution, voltage, current density, treatment time and temperature are not necessarily limited to what is described above.

Additionally, the chemical treatment using a reducing agent is only required to be able to reduce the oxide film on the metal base material with a reducing agent, and the reducing reagent may be appropriately selected according to the composition of the oxide film. Examples of the usable reducing agent include hydrazine and the hydrate thereof, formaldehyde, glyoxal and sodium borohydride. Also, for example, by using carbon as a reducing agent in a high-temperature nitrogen atmosphere, the oxide film on the metal base material can be reduced.

In the present embodiment, the reduction treatment is preferably a reductive electrolysis treatment because the reductive electrolysis treatment allows the reduction conditions to be appropriately set according to the composition, the quantity and the like of the oxide film formed on the metal base material.

<Oxidation Treatment>

The oxidation treatment oxidation-treats the oxide film having been subjected to the reduction treatment. The oxidation treatment of the oxide film having been reduced by the reduction treatment enables the oxide film on the metal base material to be easily removed. Thus, the oxidation treatment enables a satisfactorily adhesive film of a metal, a resin or the like to be formed on the metal base material, for example, by vapor deposition, plating, coating or the like. It is to be noted that the removal of the oxide film is not limited to the case where the oxide film is completely removed, but also includes the removal of the oxide film to such an extent that a satisfactorily adhesive film or the like can be formed by plating or the like. For example, in the case where the thickness of the oxide film comes to be a few nanometers or less, a satisfactorily adhesive plating film can be obtained.

The oxidation treatment is only required to be able to oxidize the oxide film having been subjected to the reduction treatment, and examples of the oxidation treatment include an oxidative electrolysis treatment and a chemical treatment using an oxidizing agent.

The oxidative electrolysis treatment in the oxidation treatment used in the present embodiment conducts electrolysis, for example, in a sulfuric acid-based acidic solution having a pH of 3 or less, preferably a pH of 1 or less, or in an alkaline solution having a pH of 10 or more, with carbon as a cathode and the metal base material as an anode under the conditions that the voltage is in a range from 1.0 to 6.0 V, preferably 4 V, the current density is in a range of 0.1 $A/dm^2$ or more, the electrolysis amount is 0.5 $coulomb/dm^2$ or more and the treatment time is 5 to 60 seconds. For the purpose of suppressing the adhesion of the hydrogen or oxygen generated at the time of the electrolysis treatment, it is preferable to add a surfactant in a content of 0.1 to 10%. Additionally, when stainless steel is used as the metal base material, the temperature of the solution is set in a range from 0 to 80° C., preferably in a range from 0 to 35° C. The conditions, in the above-described oxidation treatment, including the pH, solution, voltage, current density, treatment time and temperature are not necessarily limited to what is described above.

The chemical treatment using an oxidizing agent is also only required to be able to oxidize the oxide film on the metal base material with an oxidizing agent, and may be appropriately selected according to the composition of the oxide film. Examples of the usable oxidizing agent include: anhydrous aluminum chloride/cuprous chloride; alkali metal persulfates; ammonium persulfates; peroxides; manganese compounds such as potassium permanganate; quinones such as 2,3-dichloro-5,6-dicyano-1,4-benzoquinone (DDQ), tetrachloro-1,4-benzoquinone and tetracyano-1,4-benzoquinone; halogens such as iodine and bromine; peracids; sulfuric acid; fuming sulfuric acid; sulfur trioxide; sulfonic acids such as chlorosulfuric acid, fluorosulfuric acid and amidosulfuric acid; and ozone. In the present embodiment, the oxidation treatment is preferably an oxidative electrolysis treatment because the oxidative electrolysis treatment allows the oxidation treatment conditions, for removal of the oxide film having been subjected to the reduction treatment, to be appropriately set according to the composition, the quantity and the like of the oxide film having been subjected to the reduction treatment.

<Pre-Oxidation Treatment>

In the present embodiment, the above described reduction treatment and oxidation treatment remove the oxide film formed on the metal base material. When the film thickness of the oxide film formed on the metal base material is thick, it is preferable to perform, before the reduction treatment, a pre-oxidation treatment, which oxidation-treats the oxide film formed on the metal base material, because the reduction of the oxide film formed on the metal base material can be effectively performed by the subsequent reduction treatment.

Examples of the pre-oxidation treatment include an oxidative electrolysis treatment and a chemical treatment using an oxidizing agent, as is the case for the above-described oxidation treatment. The pre-oxidation treatment is preferably an oxidative electrolysis treatment because the oxidative electrolysis treatment allows the oxidation treatment conditions, for removal of the oxide film having been subjected to the reduction treatment, to be appropriately set according to the composition, the quantity and the like of the oxide film. The oxidative electrolysis treatment conditions for the pre-oxidation treatment are the same as the oxidative electrolysis treatment conditions for the above-described oxidation treatment.

The metal base material used in the present embodiment is not particularly limited. Examples of the metal base material include: stainless steels such as SUS316 and SUS304; and Ti, Al or the alloys of these. In particular, metals such as the stainless steels that contain iron-based components are excellent in heat resistance, corrosion resistance, strength and the like, and hence are used in various fields including vehicle parts, tableware and the below-described separators for use in fuel cells. However, stainless steel undergoes the formation of a tough oxide film thereon by a heat treatment or the like, and hence, even when a corrosion resistant, water repellent, hydrophilic or abrasion resistant film, or the like is formed on the stainless steel by plating, vapor deposition, coating or the like, the film is poor in adhesiveness and thus sometimes peels off. In the present embodiment, by performing the oxidation treatment after the above-described reduction treatment, the tough oxide film formed on the iron-based component-containing metal base material can be removed. Therefore, by the subsequent plating, vapor deposition, coating or the like, a satisfactorily adhesive metal film, a satisfactorily adhesive resin film or the like can be formed on the iron-based component-containing metal base material.

FIG. 1 is a flow chart illustrating an example of a mechanism of the surface treatment of a metal base material according to the embodiment of the present invention, provided with the steps (A), (B), (C) and (D). An oxide film 2 formed on the stainless steel 1 shown in FIG. 1(A) includes iron-based oxides, nickel-based oxides, chromium-based oxides and the like. As shown in FIG. 1(B), by performing the above-described pre-oxidation treatment, mainly the iron and nickel components can be eluted from the oxide film 2, and thus the film thickness of the oxide film 2 can be reduced. Moreover, as shown in FIG. 1(C), by performing the above-described reduction treatment, mainly the chromium component can be eluted from the oxide film 2.

Additionally, in the reduction treatment, it is preferable to reduce the oxide film until FeO comes to be included in the oxide film 2 as a component of the oxide film 2 because such a reduction facilitates the removal of the iron component in the oxide film 2 in the subsequent oxidation treatment. For example, when the oxide film shown in FIG. 1(B) includes $Fe_2O_3$ and the like, it is preferable to perform, for example, the reduction treatment such as the reductive electrolysis treatment until the following reaction is made to proceed.

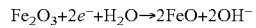

$$Fe_2O_3 + 2e^- + H_2O \rightarrow 2FeO + 2OH^-$$

Thereafter, as shown in FIG. 1(D), by performing the above-described oxidation treatment, mainly the iron component can be eluted from the oxide film 2, and thus the oxide film 2 can be removed to such an extent that the thickness of the oxide film 2 is reduced, for example, down to a few nanometers or less.

As described above, the oxide film on the metal base material can be removed by performing the oxidation treatment after the reduction treatment, or by performing the reduction treatment and the oxidation treatment after the pre-oxidation treatment. When the oxide film on the metal base material can be removed, a satisfactorily adhesive metal film, a satisfactorily adhesive resin film or the like can be formed, even by performing a film formation treatment to form a metal-containing film, a resin-containing film or the like on the metal base material by the subsequent plating, vapor deposition, coating or the like.

The metal film or the like formed by plating, vapor deposition, coating or the like is recommended to be selected according to the applications of the metal base material to be used. For example, in the below-described case of the separator for use in a fuel cell, for the purpose of imparting the corrosion resistance or the like to the reaction gas flow passage of the separator for use in a fuel cell and ensuring the contact resistance, a metal film or a conductive resin film is formed by a heretofore known noble metal plating such as a gold plating or by coating with a carbon-containing resin, respectively. Alternatively, for example, when pans and tableware are concerned, a heretofore known Ni-plating or the like is performed to form a metal film. Hereinafter, the surface treatment of the separator for use in a fuel cell is described.

Figure 2:
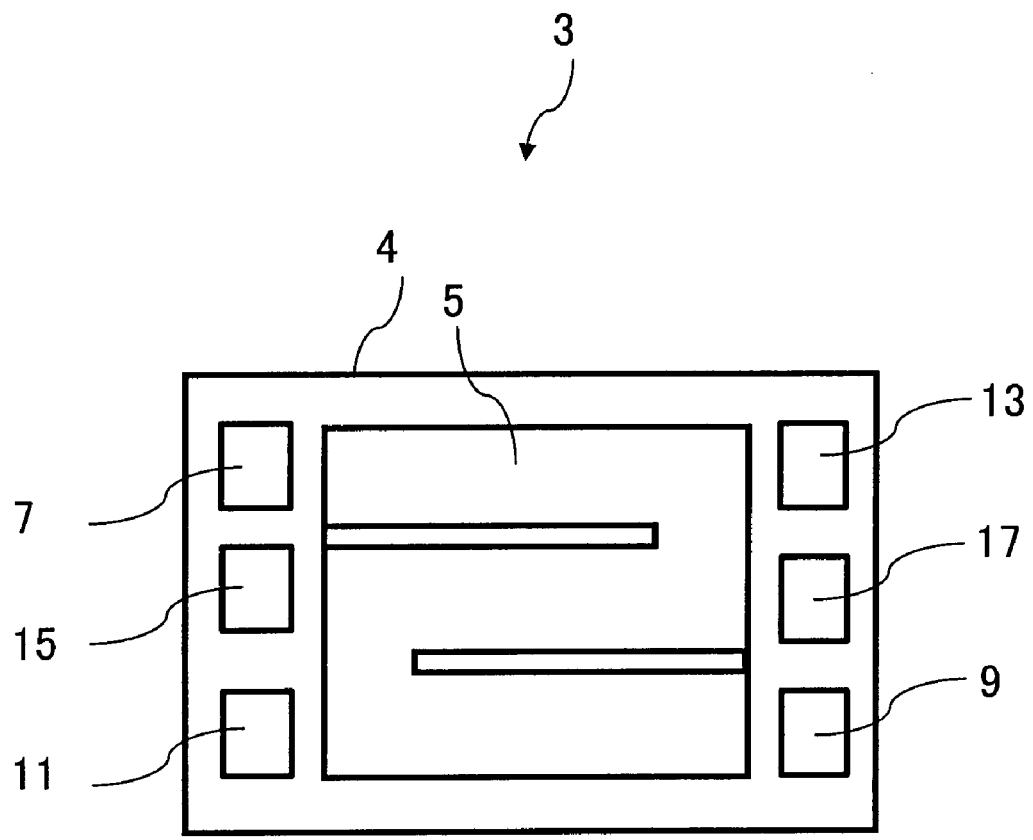
FIG. 2 is a schematic plan view illustrating an example of the structure of a separator for use in a fuel cell according to the embodiment of the present invention.

FIG. 2 is a schematic plan view illustrating an example of the structure of a separator for use in a fuel cell according to the embodiment of the present invention. As shown in FIG. 2, the separator 3 for use in a fuel cell is prepared by forming, on a metal base material 4, a reaction gas flow passage 5, an anode gas feed manifold 7, an anode gas discharge manifold 9, a cathode gas feed manifold 11, a cathode gas discharge manifold 13, a cooling medium feed manifold 15 and a cooling medium discharge manifold 17.

The reaction gas flow passage 5 feeds the reaction gas necessary for generation of electricity to the electrode of the fuel cell. When the separator 3 for use in a fuel cell is used on the anode electrode side of the fuel cell, the reaction gas flow passage 5 serves as the anode gas flow passage to feed the anode gas (for example, hydrogen gas). On the other hand, when the separator 3 is used on the cathode electrode side of the fuel cell, the reaction gas flow passage 5 serves as the cathode gas flow passage to feed the cathode gas (for example, oxygen gas). The anode gas feed manifold 7 and the anode gas discharge manifold 9 are the inlet for feeding the anode gas to and the outlet for discharging the anode gas from the anode gas flow passage, respectively. Additionally, the cathode gas feed manifold 11 and the cathode gas discharge manifold 13 are the inlet for feeding the cathode gas to and the outlet for discharging the cathode gas from the cathode gas flow passage, respectively.

Examples of the metal base material 4 used for the separator 3 for use in a fuel cell include: stainless steels such as SUS316 and SUS304; and aluminum, titanium and the alloys of these.

In the separator 3 for use in a fuel cell, for the purpose of ensuring the contact resistance thereof or ensuring the corrosion resistance thereof, a surface treatment, for example, with a metal, a resin or the like is performed on the metal base material 4. Then, for the purpose of improving the adhesion of the metal applied by coating, or for the purpose of curing the resin applied by coating, a heat treatment is applied to the metal base material 4. In this heat treatment, an oxide film is formed on the metal base material 4 (for example, the reaction gas flow passage 5 and a not-shown cooling water flow passage).

Figure 3:
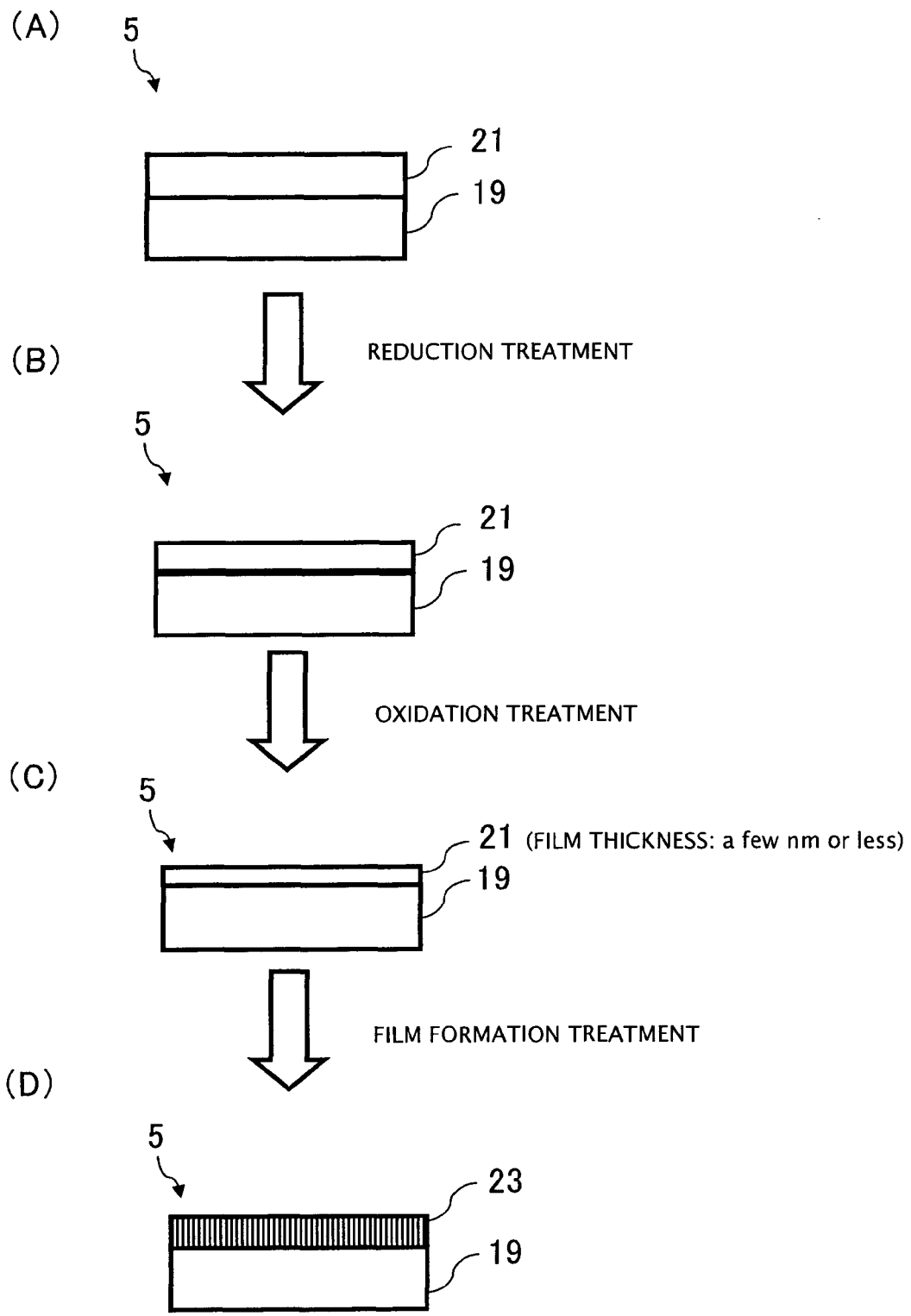
FIG. 3 is a flow chart illustrating an example of a method of surface treatment of the separator for use in a fuel cell according to the embodiment of the present invention, provided with the steps (A), (B), (C) and (D).

FIG. 3 is a flow chart illustrating an example of a method of surface treatment of the separator for use in a fuel cell according to the embodiment of the present invention, provided with the steps (A), (B), (C) and (D), and is a schematic sectional view of the metal base material (for example, the reaction gas flow passage 5) shown in FIG. 2. Additionally, description is given by taking stainless steel (stainless steel 19 shown in FIG. 3) as an example of the metal base material of the separator for use in a fuel cell. As shown in FIG. 3(A), in the separator for use in a fuel cell before being subjected to the surface treatment in the present embodiment, an oxide film 21 is formed by the above-described heat treatment, on the stainless steel 19 of the reaction gas flow passage 5, the not-shown cooling water flow passage or the like. In the oxide film 21, as described above, iron-based oxides, nickel-based oxides, chromium-based oxides and the like are included.

In the present embodiment, the separator for use in a fuel cell is first subjected to the reduction treatment, and as shown in FIG. 3(B), the oxide film 21 on the stainless steel 19 of the reaction gas flow passage 5 is reduced. The reduction treatment is preferably the above-described reductive electrolysis treatment because the reductive electrolysis treatment is free from damaging the separator for use in a fuel cell. The reductive electrolysis treatment conducts electrolysis, for example, in a sulfuric acid-based acidic solution having a pH of 3 or less, preferably a pH of 1 or less, with carbon as an anode and the separator for use in a fuel cell as a cathode under the conditions that the current density is in a range from 0.1 A/dm$^2$ to 10 A/dm$^2$ and the electrolysis amount is in a range from 0.5 coulomb/dm$^2$ to 5000 coulomb/dm$^2$. The reduction treatment conditions are not necessarily limited to what is described above. However, when the current density, the electrolysis amount and the like are outside the above-described ranges, it is sometimes difficult to reduce (for example, $Fe_2O_3 \rightarrow FeO$) the oxide film 21 until FeO comes to be included in the oxide film 21 as a component of the oxide film 21.

Next, the oxidation treatment is applied to the separator for use in a fuel cell having been subjected to the reduction treatment, and thus, as shown in FIG. 3(C), the oxide film 21 having been reduced is oxidized to be removed. The oxide film is preferably removed to such an extent that the thickness of the oxide film is reduced down to a few nanometers or less. The oxidation treatment is preferably the above-described oxidative electrolysis treatment because the oxidative electrolysis treatment is free from damaging the separator for use in a fuel cell. The oxidative electrolysis treatment conducts electrolysis, for example, in a sulfuric acid-based acidic solution having a pH of 3 or less, preferably a pH of 1 or less, with carbon as a cathode and the separator for use in a fuel cell as an anode under the conditions that the current density is in a range from 0.1 A/dm$^2$ to 10 A/dm$^2$ and the electrolysis amount is in a range from 0.5 coulomb/dm$^2$ to 100 coulomb/dm$^2$. The oxidation treatment conditions are not necessarily limited to what is described above.

Additionally, it is preferable, before the reduction treatment, to apply the above-described pre-oxidation treatment to the separator for use in a fuel cell. The pre-oxidation treatment conditions are the same as the conditions of the above-described oxidation treatment.

Next, plating, vapor deposition, coating or the like is applied to the reaction gas flow passage 5, the not-shown cooling water flow passage and the like of the separator for use in a fuel cell, having been subjected to the removal of the oxide film, and thus a metal- or resin-containing film 23 is formed (film formation treatment) as shown in FIG. 3(D). As the film formation treatment of a film formed on the stainless steel 19 of the reaction gas flow passage 5, it is preferable to perform a noble metal plating such as a gold plating because such a plating imparts corrosion resistance to the reaction gas flow passage. For the noble metal plating such as the gold plating, or other similar operations, heretofore known methods can be applied. In the present embodiment, by performing the oxidation treatment after the reduction treatment, and performing the reduction treatment after the pre-oxidation treatment and the oxidation treatment, the oxide film can be removed to such an extent that the thickness of the oxide film is reduced down to a few nanometers or less. Therefore, even when plating or the like is performed after the removal of the oxide film, a satisfactorily adhesive metal film can be formed. It is to be noted that in the present embodiment the metal film formation is not necessarily limited to the formation of a metal film by the noble metal plating. The metal film may also be formed by other techniques such as plating (including electroless plating) such as nickel plating or Zn plating, vapor deposition and coating. Alternatively, for the purpose of imparting hydrophilicity or other purposes, a resin film may also be formed by coating with a resin (including carbon-containing resins) or the like.

As described above, in the method of surface treatment of a metal base material of the present embodiment, the method includes a reduction treatment step of reduction-treating the oxide film formed on the metal base material and an oxidation treatment step of oxidation-treating the oxide film having been subjected to the reduction treatment, and thus the oxide film formed on the metal base material can be removed. Thus, even when a film formation treatment of forming a metal film, a resin film or the like on the metal base material is performed, a satisfactorily adhesive metal film, a satisfactorily adhesive resin film or the like can be formed.

The invention claimed is:

1. A method of surface treatment of a metal base material, the method comprising:
   a reduction treatment step of reduction-treating an oxide film formed on the metal base material; and
   an oxidation treatment step of oxidation-treating the oxide film having been subjected to the reduction treatment to remove the oxide film,
   wherein the metal base material is an iron component-containing metal base material, and, in the reduction treatment step, reduction is performed until FeO comes to be included in the oxide film as a component of the oxide film.

2. The method of surface treatment of a metal base material according to claim 1, the method further comprising a pre-oxidation treatment step of oxidation-treating, before the reduction treatment step, the oxide film formed on the metal base material.

3. The method of surface treatment of a metal base material according to claim 1, wherein at least one of the reduction treatment, the oxidation treatment and the pre-oxidation treatment is an electrolysis treatment.

4. The method of surface treatment of a metal base material according to claim 1, wherein, in the reduction treatment step, a reductive electrolysis treatment is performed in an acidic solution having a pH of 1 or less, and, in the oxidation treatment step, an oxidative electrolysis treatment is performed in an alkaline solution having a pH of 10 or more.

5. The method of surface treatment of a metal base material according to claim 4, wherein, in the pre-oxidation treatment step, an oxidative electrolysis treatment is performed in an acidic solution having a pH of 1 or less.

6. The method of surface treatment of a metal base material according to claim 1, the method further comprising a film formation step of forming, after the oxidation treatment step, a metal- or resin-containing film on the metal base material.

7. The method of surface treatment of a metal base material according to claim 1, wherein the metal base material is a separator for use in a fuel cell.

8. The method of surface treatment of a metal base material according to claim 1, wherein the reduction treatment is an electrolysis treatment or a chemical treatment using a reducing agent.

9. The method of surface treatment of a metal base material according to claim 8, wherein the reducing agent is selected from hydrazine, formaldehyde, glyoxal and sodium borohydride.

10. The method of surface treatment of a metal base material according to claim 1, wherein the oxidation treatment is an electrolysis treatment or a chemical treatment using an oxidizing agent.

11. The method of surface treatment of a metal base material according to claim 10, wherein the oxidizing agent is selected from anhydrous aluminum chloride/cuprous chloride, alkali metal persulfates, ammonium persulfate, potassium permanganate, quinones, halogens, peracids, sulfuric acid, fuming sulfuric acid, sulfur trioxide, sulfonic acids, and ozone.

12. The method of surface treatment of a metal base material according to claim 11, wherein the oxidizing agent is quinones selected from 2,3-dichloro-5,6-dicyano-1,4-benzoquinone (DDQ), tetrachloro-1,4-benzoquinone and tetracyano-1,4-benzoquinone.

13. The method of surface treatment of a metal base material according to claim 11, wherein the oxidizing agent is halogens selected from iodine and bromine.

14. The method of surface treatment of a metal base material according to claim 11, wherein the oxidizing agent is sulfonic acids selected from chlorosulfuric acid, fluorosulfuric acid and amidosulfuric acid.

* * * * *